(No Model.)
W. R. WHITE.
SLIDING GATE.
No. 380,613. Patented Apr. 3, 1888.
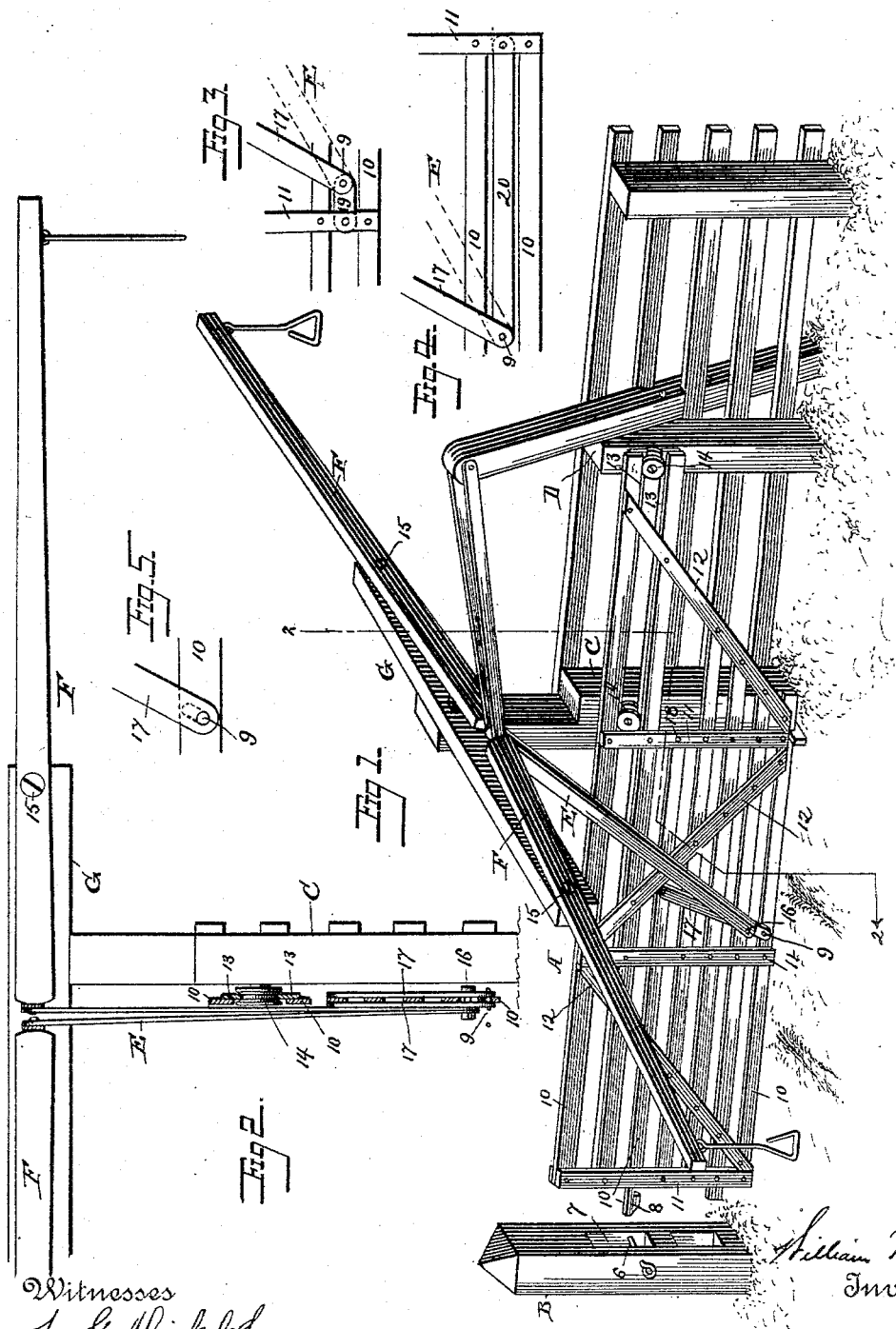
Witnesses
Jno. G. Hinkel Jr.
Sidney L. Johnson
William R. White,
Inventor.
by Foster & Freeman
Attorneys.

UNITED STATES PATENT OFFICE.

WILLIAM RICHARD WHITE, OF NEOGA, ILLINOIS.

SLIDING GATE.

SPECIFICATION forming part of Letters Patent No. 380,613, dated April 3, 1888.

Application filed October 12, 1887. Serial No. 252,173. (No model.)

*To all whom it may concern:*

Be it known that I, WILLIAM RICHARD WHITE, a citizen of the United States, residing at Neoga, in the county of Cumberland and State of Illinois, have invented certain new and useful Improvements in Sliding Gates, of which the following is a specification.

This invention relates to that class of gates in which a gate sliding across a roadway is controlled by the action of a suspended lever; and it consists particularly in improvements upon Patent No. 258,517, granted to me May 25, 1882.

In the accompanying drawings, Figure 1 is a perspective view of a gate provided with the present improvements. Fig. 2 is a sectional elevation of the same taken on the line 2 2 of Fig. 1, looking toward the latch end of the gate. Fig. 3 is a modification of the mode of connecting the suspended lever with the gate-latch bar. Fig. 4 is another modification of the same feature. Fig. 5 is a detail hereinafter referred to.

Referring to said drawings, A is a gate adapted to close the opening between two fence-posts, B C. This gate is formed of longitudinal slats 10, suitably connected together and braced by vertical strips 11 and diagonal strips 12. The two upper longitudinal strips of the gate are each provided with a second strip, 13, lapping slightly beyond them, as shown in Fig. 2, to form a track by which the gate is supported upon flanged wheels 14, one journaled on the post C and the other on a third post, D. These longitudinal lapped slats, it will be noticed, are placed on one side of the gate, and the diagonal strips 12 and the intermediate vertical strips, 11, are placed on the opposite side of the longitudinal slats of the gate, so that the said diagonal and vertical strips will be permitted to pass the flange of the wheels as the gate is moved back and forth.

Connected with the gate is a suspended lever, E, that is preferably composed of two strips connected together near their lower ends and free at their upper ends, so as to form a slight spring structure, for a purpose which will hereinafter appear.

The upper end of each of the strips forming the lever E is connected to an operating-lever, F, pivoted at 15 to a cross-beam, G, secured to the post C, which for this purpose is made somewhat higher than the ordinary fence-post. The outer end of each of the operating-levers may be provided with a suspended link within reach of a pedestrian or a rider, so that as he approaches the gate he may vibrate the lever and slide the gate open, and as he passes through the gate may vibrate the other lever and close the gate.

The lower end of the suspended lever E is pivotally connected at 16 to a connecting-strip, 17, which may be of single or duplex form, the opposite end of this connecting-strip being secured to one of the longitudinal slats 10 of the gate. The end of this connecting-strip 17, near the point at which the suspended lever is pivoted, is continued downward slightly and connected by a pin, 9, with the lower slat of the gate. This pin 9 enters a slot (see Fig. 5) formed in this lower slat of the gate, so as to permit the slat 17 to have a slight vertical play. The slat 10, to which the connecting-strip is secured, is projected in front of the front strip, 11, of the gate, and is there formed into a latch, 8, adapted to enter a suitable slot, 7, in the post B and engage with a pin or other projection, 6, in said slot, so as to hold the gate closed. This latch-slat 10 is not connected with the gate except at its rear end at 18, where it may be secured rigidly thereto by two or more rivets, or be hinged thereto by a single rivet. The latch end of this slat, and, in fact, the entire length of the slat beyond its secured end, is free to be moved up and down by the movement of the connecting-strip 17.

The operation of opening the gate and simultaneously unlatching it, so that it may be opened, is effected by a movement of one of the levers F. Thus it will be seen that if one of the levers F is pulled downward an upward pull will be exerted upon suspended lever E, which will force upward the connecting-strip 17, and thus raise the latch-slat 10 out of engagement with the pin 6 in the slot in the post B. As soon as this has been accomplished, a still further downward movement of the lever F raises the suspended lever E and causes it to vibrate to the other side of the post and draw the gate with it, sufficient momentum being imparted to the gate to cause the lever E to pass its center. Thus it will be seen there is provided a latch by which the gate is locked closed, and that in the operation of opening the gate by vibrating either of the operating-levers F this latch will be released and the gate opened.

The particular connection between the suspended lever E and the latch-slat 10 may be varied in many ways. Thus, for instance, instead of connecting the lower end of the connecting-strip 17 to the lower slat a short strip, 19, (see Fig. 3,) may be secured to the central vertical strip, 11, between the two lower slats, it being of such a size as to be capable of slight play between the two slats. The connecting-strip 17 and the lower end of the suspended lever E will be pivotally secured to the free end of this strip 19, and the operation of lifting the latch and opening the gate will be the same as that before described. Although the short strip 19 may have the pivotal motion referred to, said short strip will be preferably provided with a slot for the connecting-pin 9, so that the strip 19 may be a fixed one and the pin connecting the strip 17 and the suspended lever may be able to move in said slot. Instead, also, of such a strip, 19, there may be substituted a bar, 20, (see Fig. 4,) pivoted at its rear end to one of the vertical slats 11 of the gate and adapted to lie between the two lower slats of the gate and free at its forward end to move between the slats and at said end be connected to the connecting-strip 17 and lever E in the same manner as was the strip 19, and having slight play between the slats the said slot for the pin 9 may be dispensed with.

What I claim is—

1. The combination of a sliding gate, a longitudinal slat, 10, secured at one end to the gate and at the other end free to move, and having at such free end a latch, a suspended lever, E, mounted at one end independent of the gate and connected to said slat at a point between its ends to move the latch end thereof, and an operating-lever connected to the suspended lever to vibrate the same and slide the gate, substantially as described.

2. The combination of a sliding gate, a longitudinal slat, 10, secured at one end to the gate and at the other end free to move, and having at such free end a latch, a suspended lever, E, a connecting-strip, 17, mounted on the gate and interposed between the lever and the slat to move the latch end thereof, and an operating lever connected to the suspended lever to vibrate the same and slide the gate, substantially as described.

3. The combination of a sliding gate, a longitudinal slat, 10, secured at one end to the gate and free to move at its other end, and having a latch at said free end, a suspended lever, E, a strip, 19, pivoted to the gate, and a connecting-strip interposed between one end of said strip 19 and said slat, and both strips connected to one end of the suspended lever, and an operating-lever connected to said suspended lever for raising the latch end of said slat and vibrating the lever to slide the gate open or closed, substantially as described.

In testimony whereof I have signed my name to this specification in the presence of two subscribing witnesses.

WILLIAM RICHARD WHITE.

Witnesses:
U. A. GREGG,
JOHN F. WHITE.